(12) United States Patent
Noda

(10) Patent No.: US 11,769,887 B2
(45) Date of Patent: Sep. 26, 2023

(54) COMBUSTION SYSTEM AND COMBUSTION CONTROL METHOD

(71) Applicant: NISSAN MOTOR CO., LTD., Yokohama (JP)

(72) Inventor: Tetsushi Noda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 343 days.

(21) Appl. No.: 17/294,765

(22) PCT Filed: Nov. 22, 2018

(86) PCT No.: PCT/JP2018/043261
§ 371 (c)(1),
(2) Date: May 18, 2021

(87) PCT Pub. No.: WO2020/105190
PCT Pub. Date: May 28, 2020

(65) Prior Publication Data
US 2022/0021009 A1   Jan. 20, 2022

(51) Int. Cl.
*H01M 8/04014* (2016.01)
*H01M 8/04302* (2016.01)
*F23C 13/02* (2006.01)

(52) U.S. Cl.
CPC ......... *H01M 8/04022* (2013.01); *F23C 13/02* (2013.01); *H01M 8/04302* (2016.02)

(58) Field of Classification Search
None
See application file for complete search history.

(56) References Cited

FOREIGN PATENT DOCUMENTS

| JP | 2013-253004 A | 12/2013 | |
|---|---|---|---|
| JP | 2014111509 A1 * | 6/2019 | ............... C01B 3/38 |

* cited by examiner

*Primary Examiner* — Lucas J. O'Donnell
(74) *Attorney, Agent, or Firm* — Foley & Lardner LLP

(57) ABSTRACT

A control method of a combustion system for controlling combustion of fuel within a combustor, the combustion system including the combustor having a catalyst for promoting the combustion and a first heater arranged so as to be able to supply heat to the catalyst, including: supplying the fuel and oxidizing gas to the combustor along with providing the heat to the catalyst by the first heater; and deactivating the first heater at a prescribed timing and increasing a flow rate of the fuel greater than that have been set before deactivating the first heater, wherein the prescribed timing is determined as a timing at which a generated heat of the fuel prior to deactivation of the first heater becomes equal to or greater than a heat required for raising a temperature of the fuel having the flow rate after increased up to a light-off temperature of the catalyst.

16 Claims, 8 Drawing Sheets

(a)

(b)

COMBUSTION SYSTEM AND COMBUSTION CONTROL METHOD

TECHNICAL FIELD

The present invention relates to a combustion system including a catalytically supported combustor and its control method.

BACKGROUND ART

A technique relating to a reformer or reforming system as described hereinafter has been disclosed in JP2013-253004A, which is characterized by a provision of oxidation catalyst and an electric heater on the upstream side of the catalyst. The electric heater is activated following the start of the reformer, and the air heated by the electric heater is used to raise the temperature of the oxidation catalyst. The electric heater is deactivated when the temperature of the oxidation catalyst reaches a prescribed value, and this event triggers supply of fuel to the reformer (paragraph 0032 to 0033).

SUMMARY OF INVENTION

A problem may arise, however, in a combustion system that uses a heating element such as an electric heater to raise the temperature of catalyst inside a combustor, if the timing to deactivate the electric heater is determined solely based on the catalyst temperature as described in JP2013-253004A. Namely, the catalyst is cooled by the fuel supplied after the electric heater has been deactivated, possibly resulting in excursion from optimal activation state of the catalyst. This problem becomes more pronounced if the fuel with larger latent heat of evaporation is used. Lowering of catalyst temperature may render proper continuation of catalytic reactions difficult, compromising effective use of reaction heat. In addition, a serious concern about degraded exhaust properties may arise.

In view of the above stated problems, an objective of this invention is to provide an improved combustion system and a relevant control method, wherein the heater providing heat to the catalyst incorporated in the combustor can be deactivated at an appropriate time.

In an aspect of this invention, a control method of a combustion system for controlling combustion of fuel within a combustor is provided. The combustion system includes the combustor having a catalyst for promoting combustion and a first heater arranged so as to be able to supply heat to the catalyst. In this aspect, the control method includes: supplying the fuel and oxidizing gas to the combustor along with providing the heat to the catalyst by the first heater; and deactivating the first heater at a prescribed timing and increasing a flow rate of the fuel greater than that have been set before deactivating the first heater. Here, the prescribed timing is determined as a timing at which a generated heat of the fuel prior to deactivation of the first heater becomes equal to or greater than the heat required to raise a temperature of the fuel after increased in the flow rate up to a light-off temperature of the catalyst.

In other aspects, the combustion system is provided.

DESCRIPTION OF EMBODIMENTS

Hereinafter, embodiments of the present invention are described referring to the figures.

(Entire Construction of the Fuel Cell System)

Figure 1:
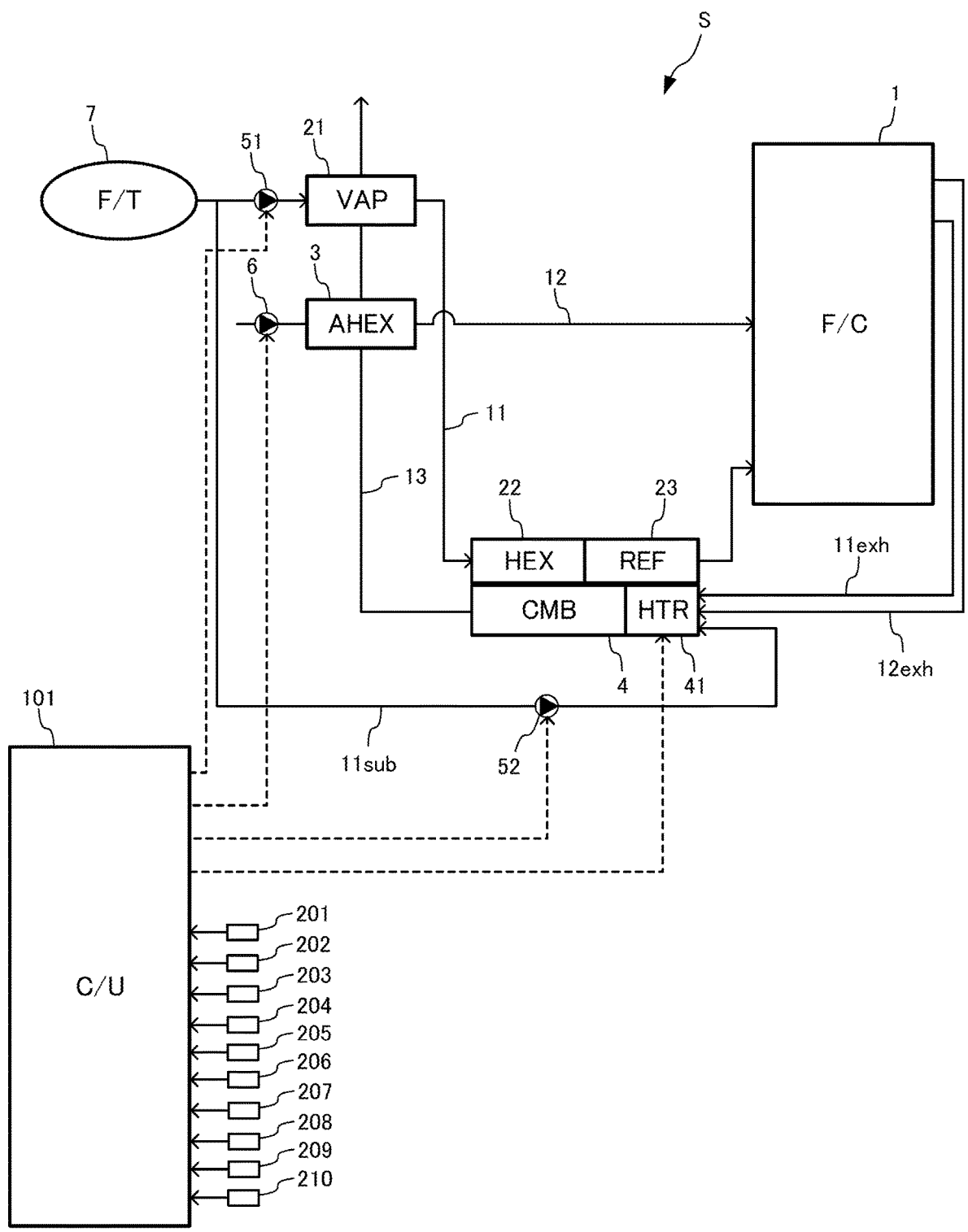
FIG. 1 shows a schematic representation of an entire structure of a fuel cell system that includes a combustion system according to an embodiment of the present invention.

FIG. 1 shows the schematic entire construction of the fuel cell system equipped with a combustion system according to one embodiment of the present invention.

In this embodiment, the fuel cell system S (hereinafter simply referred to as "system") includes a fuel cell stack 1, fuel processing parts 21 to 23, an oxidizer gas heating part 3, a combustor 4, and a system controller 101.

The fuel cell stack (hereinafter simply referred to as "stack") 1 is constructed by stacking up plurality of fuel cells or fuel cell unit cells, and each fuel cell (power generator) is, for example, of the type of solid oxide fuel cell (SOFC).

The fuel processing parts 21 to 23 process raw fuel (primary fuel) and convert it to fuel gas used in power generation reactions that take place in the fuel cell. The fuel processing parts 21 to 23 are interposed in an anode gas supply passage 11 and receive raw fuel supply. In the present embodiment, the raw fuel is a mixture of an oxygen-containing fuel and water, which is stored in a fuel tank 7 connected to the anode gas supply passage 11. The raw fuel applicable to the present embodiment includes, for example, an ethanol-water mixture (i.e., ethanol aqueous solution). If the raw fuel includes the ethanol-water mixture, the fuel gas is hydrogen obtained by reforming ethanol.

The oxidizer gas heating part 3 raises the temperature of oxidizer gas before it is supplied to the fuel cell stack 1. The oxidizer gas heating part 3 is located in a cathode gas supply passage 12 and receives supply of oxidizing gas. Air is an example of the oxidizing gas, in which case atmospheric air is supplied to the cathode electrode of the fuel cell stack 1, thus enabling supply of oxygen to the cathode electrode for use in electric power generation reactions.

Chemical reactions that take place in the anode and cathode electrode of a solid oxide fuel cell to produce electric power are represented in the following formulas.

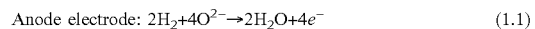

$$\text{Anode electrode: } 2H_2 + 4O^{2-} \rightarrow 2H_2O + 4e^- \qquad (1.1)$$

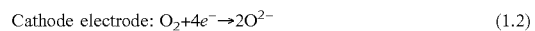

$$\text{Cathode electrode: } O_2 + 4e^- \rightarrow 2O^{2-} \qquad (1.2)$$

After the system has completed warm-up phase and enters into normal system operation (hereinafter simply referred to as "normal operation"), residual fuel (i.e., residual hydrogen) contained in the exhaust gas from the fuel cell stack 1 is combusted in the combustor 4, producing a combustion gas. In this embodiment, the combustor 4 is connected to an anode off-gas passage 11exh and cathode off-gas passage 12exh, and the combustor 4 receives anode and cathode off-gas supply through these two passages (i.e., 11exh and 12exh). The heat generated by combustion can be used to supply heat to elements that should be maintained at a prescribed temperature during the fuel cell system S is in operation. In this embodiment, the combustion gas generated in the combustor 4 is supplied to the oxidizer gas heating part 3 and the fuel processing part (especially, its evaporator 21) through a combustion gas passage 13, and the heat from combustion gas is transferred to a fuel heat exchanger 22 (in fuel processing portion) and reformer 23 through thermal conduction and heat radiation. In other word, in this embodiment, the combustion gas generated in the combustor 4 is utilized as a media to heat the raw fuel (i.e., ethanol-water solution) and oxidizer gas (i.e., air).

Further description of the construction of the fuel cell system S: the fuel cell stack 1 is provided with, on its anode side, the anode gas supply passage 11 that provides fuel gas to the anode electrode of the fuel cell and the anode off-gas passage 11exh that flows the off-gas resulting from power generation reaction. The fuel cell stack 1 is also provided with, on its cathode side, the cathode gas supply passage 12 that supplies oxidizer gas to the cathode electrode of the fuel cell and the cathode off-gas passage 12exh that drains off-gas resulting from power generation reaction.

Along the anode gas supply passage 11 connecting a fuel tank 7 and the anode electrode of the fuel cell stack 1, three elements-evaporator 21, fuel heat exchanger 22 and reformer 23 are interposed in this order from the upstream side to the downstream side of in a flow direction. Furthermore, a passage (fuel branch passage 11) is branched off from the anode gas supply passage 11 at the upstream side of the evaporator 21, which is routed to be connected with the combustor 4. A first fuel injector 51 is interposed in the anode gas supply passage 11 between a branch point of a fuel passage 11sub and the evaporator 21, and a second fuel injector 52 is interposed in the fuel branch passage 11sub respectively.

The evaporator 21 receives ethanol-water solution (i.e., raw fuel) supply from the fuel tank 7, and vaporizes the solution by heating to produce gaseous ethanol and water vapor.

The fuel heat exchanger 22 further heats up the ethanol gas and water vapor.

The reformer 23 contains reforming catalyst therein to perform a steam reforming reaction to produce hydrogen from the gaseous ethanol. Stoichiometry of the steam reforming reaction is expressed by the following formula.

$$C_2H_5OH + 3H_2O \rightarrow 6H_2 + 2CO_2 \quad (2)$$

The oxidizer gas heating part 3 is composed of an air heat exchanger, which exchanges heat with the combustion gas, thus heating up the oxidizer gas flowing through the cathode gas supply passage 12. In this embodiment, a blower or an air-compressor 6 is installed in the vicinity of the opening edge of the cathode gas supply passage 12, enabling effective intake of the oxidizer gas (i.e., atmospheric air) into the cathode gas supply passage 12 through the blower 6. The air taken into the system at normal temperature (for example, 25° C.) is heated up while flowing through the oxidizer gas heating part 3, before being supplied to the fuel cell stack 1.

The combustor 4, which contains catalyst for combusting, receives anode and cathode off-gas supply from the fuel cell stack 1, and produces combustion gas by way of catalyst-supported combustion of residual fuel contained in the anode off-gas. Here, residual oxygen contained in the cathode off-gas plays a role of combustion improver, i.e., the oxidizer gas to assist efficient combustion. In addition to the anode off-gas, ethanol-water solution (or raw fuel) may be supplied to the combustor 4 through the fuel branch passage 11sub, in which case ethanol is also combusted for generating combustion gas. Needless to say, the supply to the combustor 4 can be configured to be solely the anode off-gas, or solely the ethanol-water solution, or both. When operated solely on the supply of ethanol-water solution, the anode off-gas can be switched to an alternative passage that bypasses the combustor 4.

In this embodiment, a heater 41 (equivalent to the "first heater") is attached to the combustor 4 at the upstream side in the anode off-gas and raw fuel passages. The heater 41 contains an electric heater to raise the temperature of the flow passages that run through the heater 41, wherein a catalyst for combustion is supported on the inner wall surface of the flow passages. The catalyst for combustion is basically the same type with that used in the combustor 4, but with modified composition. Thus, the heater 41 heats the fuel supply to the combustor 4 using two means-electric heater and catalyst-prior to its entry into the combustor 4, wherein the fuel supply consists of two sources: residual fuel contained in cathode off-gas from fuel cell stack 1, and raw fuel introduced through the fuel branch passage 11sub. Here, the heater 41 can perform heating solely by means of the electric heater. For example, if the catalyst is in an inactive state, the heater 41 can still provide heated residual fuel and raw fuel to the combustor 4 using the electric heater.

The system controller 101 performs the following controls while the fuel cell system S is in operation: control of fuel supply to the evaporator 21 and combustor 4 (fuel supply control of the latter is performed by way of the heater 41); control of oxidizer gas supply to the oxidizer gas heating part 3; and operation control of the heater 41. In this embodiment, the system controller 101 is configured as an electronic control unit. The first fuel injector 51, second fuel injector 52, blower 6, and heater 41 operate according to a signal from the system controller 101 to perform the following processes: fuel supply to the evaporator 21 and combustor 4; oxidizer gas supply to the oxidizer gas heating part 3; and heating of the fuel to the combustor 4 prior to the entry of the fuel into the combustor 4. The fuel supply to the combustor 4 consists of two sources: the fuel provided by way of the fuel cell stack 1 (residual fuel); and the fuel directly provided from the fuel tank 7 (raw fuel).

Electric power generated by the fuel cell stack 1 can also be used for such purposes as charging a battery (not shown) and driving external devices such as electric motors and motor generators. For example, the fuel cell system S can be applied to a driving system to generate driving force for a vehicle in a variety of ways such as: charging a battery using the electric power generated by the fuel cell stack 1 in rated operation; and providing combined output from the fuel cell stack 1 and the battery to the motor generator driving a vehicle in response to a target driving force.

(Construction and Basic Operations of the Control System)

In this embodiment, the system controller 101 is constituted as an electronic control unit including a central processing unit (CPU), types of memory units including ROM and RAM, and an electronic control unit having a set of I/O interface, to control the operations of devices and parts required to operate the fuel cell system S such as the first fuel injector 51, the second fuel injector 52, the blower 6, and the heater 41.

For proper control of the fuel cell system S, the system controller 101 receives the following signals: a signal from an anode inlet temperature sensor 201 detecting an anode inlet temperature Tand_int, a signal from a cathode inlet temperature sensor 202 detecting a cathode inlet temperature Tcth_int, a signal from a stack outlet temperature sensor 203 detecting a stack outlet temperature Tstk_out, a signal from a fuel flow sensor 204 detecting a fuel flow rate Qf, a signal from an oxidizer gas flow sensor 205 detecting an oxidizer gas flow rate Qa, a signal from a stack voltage sensor 206 detecting a stack voltage Vstk, a signal from a stack current sensor 207 detecting a stack current Istk, a signal from a heater voltage sensor 208 detecting a heater voltage Vh, a signal from a heater current sensor 209 detecting a heater current Ih, as well as a signal from a system start switch 201 and a signal from a accelerator sensor (not shown in the figure).

The anode inlet temperature Tand_int represents a temperature of the anode gas flow supplied to the anode electrode of the fuel cell stack 1, the value of which is obtained from an output of the anode inlet temperature sensor 201 located in the anode gas supply passage 11 in the vicinity of its connecting portion to the stack.

The cathode inlet temperature Tcth_int represents a temperature of the cathode gas flow supplied to the cathode electrode of the fuel cell stack 1, the value of which is obtained from an output of the cathode inlet temperature sensor 202 located in the cathode gas supply passage 12 in the vicinity of its connecting portion to the stack.

The stack outlet temperature Tstk_out represents an off-gas temperature discharged from the fuel cell stack 1, the value of which is obtained from the stack outlet temperature sensor 203 located in the vicinity of a cathode outlet portion of the fuel cell stack 1. In this embodiment, the stack outlet temperature Tstk_out is used as an indicator of a temperature of the oxidizer gas supplied to the combustor 4.

The fuel flow rate Qf, representing a flow rate of raw fuel supply to the combustor 4, is obtained by the fuel flow sensor 204 disposed in the vicinity of a joining part where the fuel branch passage 11sub is connected to the heater 41.

The oxidizer gas flow rate Qa, representing a flow rate of oxidizing gas supply to the cathode electrode of fuel cell stack 1, is obtained by the oxidizer gas flow sensor 205 disposed in the cathode gas supply passage 12 to the upstream side of the oxidizer gas heating part 3. In this embodiment, oxidizer gas flow rate Qa is used as an indicator of the flow rate of the oxidizer gas supplied to the combustor 4.

The stack voltage Vstk represents a voltage generated by the fuel cell stack 1 and is obtained by the stack voltage sensor 206 disposed so that the stack voltage sensor 206 can detect a terminal-to-terminal voltage of the fuel cell stack 1.

The stack current Istk represents a current generated by the fuel cell stack 1 and is obtained by the stack current sensor 207 disposed so that the stack voltage sensor 206 can detect a terminal-to-terminal current of the fuel cell stack 1.

The heater voltage Vh represents a voltage applied to the electric heater of the heater 41 and is detected by the heater voltage sensor 208.

The heater current Ih represents a current that flows through the electric heater of the heater 41 and is detected by the heater current sensor 209.

The system start switch 201 operated by the driver sends out a signal to request the fuel cell system S to start.

The accelerator sensor typically detects an operation amount of an accelerator pedal by the driver, which provides an indicator of the travel driving force (i.e. Target driving force) required by the vehicle.

When the system controller 101 receives a request signal to start the fuel cell system S from the system start switch 201, the system controller 101 activates a pre-programmed start-up control sequences and start a warming-up of the fuel cell stack 1. The warming-up means a raising process for raising the temperature of the fuel cell stack 1 from a lower temperature (In particular, an ambient temperature) during the fuel cell stack 1 being stopped up to an operational temperature of the fuel cell stack 1.

When the temperature of the fuel cell stack 1 reaches the operational temperature during the warming-up, the system controller 101 terminates the start-up control sequences and shifts into a normal power generation control mode. In this mode, the fuel cell stack 1 is operated basically at a rated points. In this mode, the raw fuel is also supplied to the evaporator 21 by way of the first fuel injector 51, the flow rate of the raw fuel satisfying an amount required to maintain the rated operation. The "rated operation" of the fuel cell stack 1 refers to a mode of operation that brings out a maximum power generation output from the fuel cell stack 1.

(Basic Operations of the Fuel Cell System)

Figure 2:
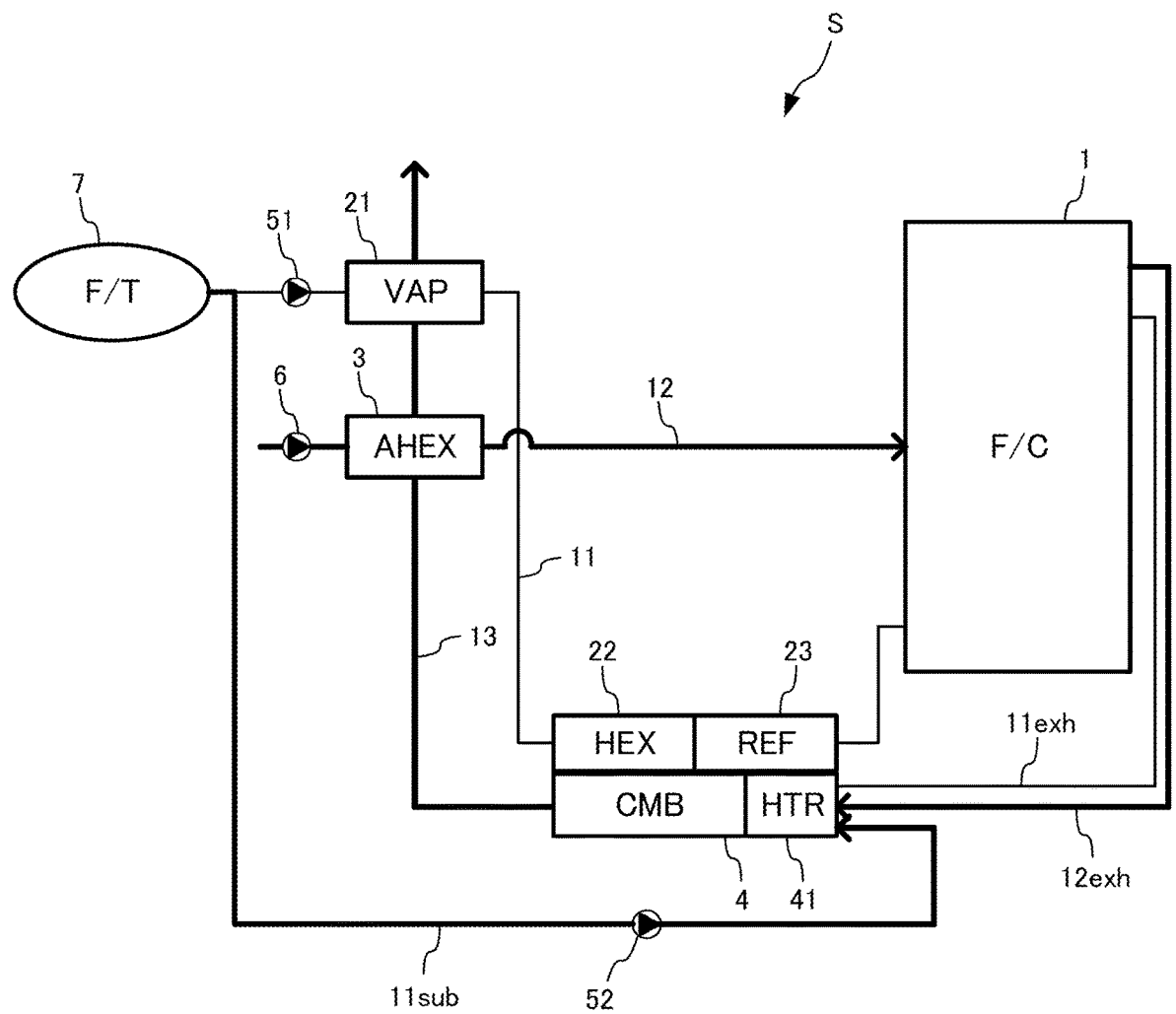
FIG. 2 schematically represents actions taking place in a start-up phase of the above-described fuel cell system.
Figure 3:
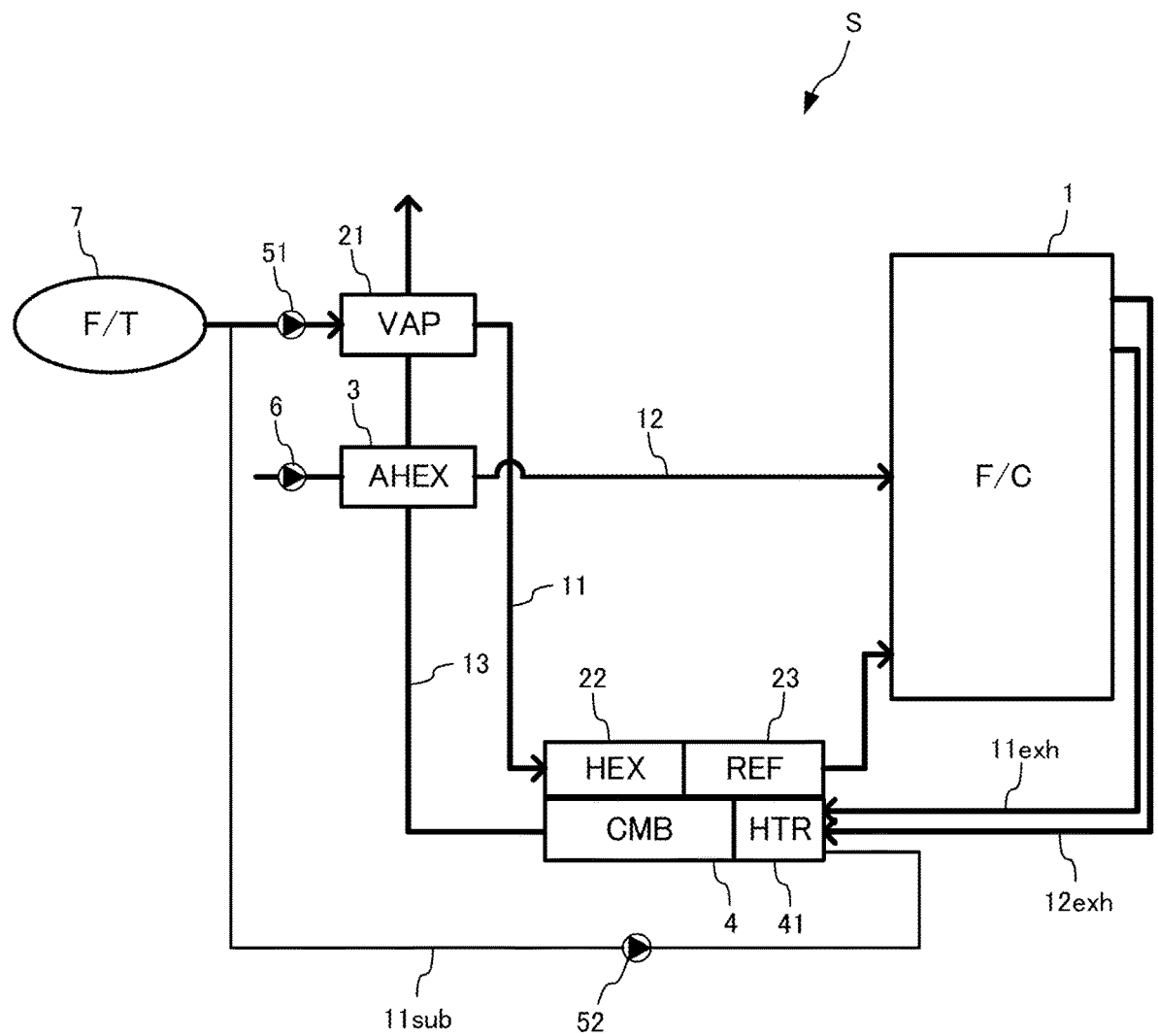
FIG. 3 schematically represents actions taking place in a steady-operation phase of the above-described fuel cell system.
Figure 4:
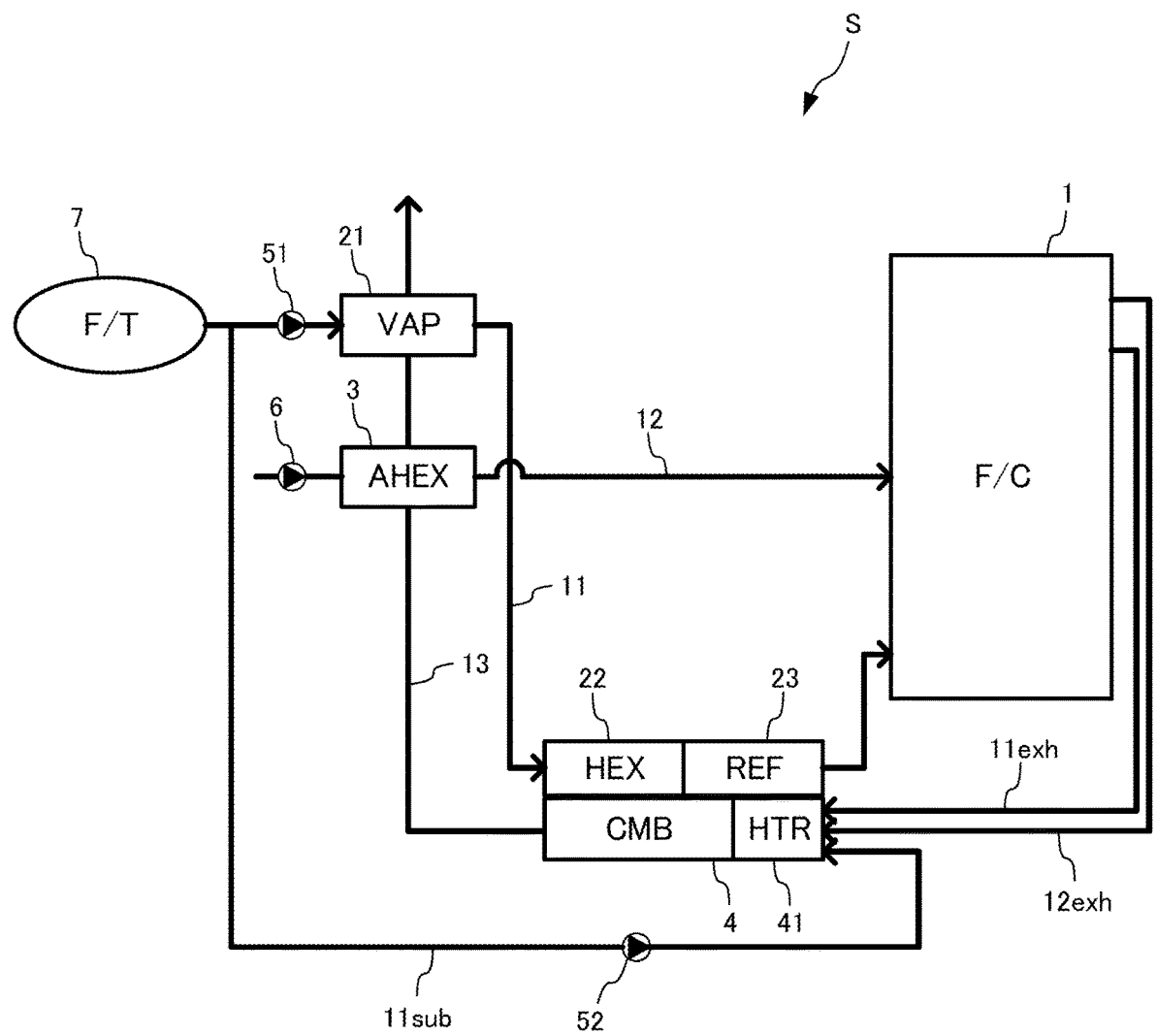
FIG. 4 schematically represents motions taking place in the above-described fuel cell system at the steady-operation phase (especially when a combustor output is enhanced.

Basic operations of the fuel cell system S during start-up and normal phase are shown schematically from FIG. 2 to FIG. 4. FIG. 2 shows the operation during the start-up of the system, and FIG. 3 and FIG. 4 show the operation in the normal phase respectively. In these figures, thick solid lines with an arrow indicate the passages through which a gas/liquid flows, and thin solid lines without an arrow indicate the passages without flow.

During the start-up (FIG. 2), the first fuel injector 51 is deactivated while the second fuel injector 52 is activated to supply the raw fuel stored in the fuel tank 7 into the combustor 4. The raw fuel supply passes through the heater 41 before entering the combustor 4. In cases where the catalyst included in the combustor 4 is not yet fully activated, or a good combusting condition has not been attained for efficient combustion of the raw fuel, the heater equipped in the heater 41 is turned on to provide sufficient heat to the catalyst. The blower 6 takes in atmospheric air into the cathode gas supply passage 12 and supplies the air into the fuel cell stack 1 by way of the oxidizer gas heating part 3. The air, after passing through the fuel cell stack 1, flows through the cathode off-gas passage 12exh is supplied to the combustor 4, where the air works as an auxiliary combustion improver. By the same token, supply of air to the combustor 4 also flows through the heater 41, where the electric heater raises the temperature of the air, as well as the raw fuel. The combustion gas generated in the combustor 4 is supplied, by way of the combustion gas passage 13, to the oxidizer gas heating part 3 and the evaporator 21. The heat generated in the combustor 4 is supplied to the fuel heat exchanger 22 and the reformer 23 (both are included in the fuel processing part). In this fashion, the fuel cell stack 1 in start-up is heated by the air heated in the oxidizer gas heating part 3 in addition to the heating by thermal radiation from the combusted raw fuel, resulting in an effective warming-up of the fuel cell stack 1.

When the system enters into normal operation (FIG. 3), the first fuel injector 51 is activated to start supplying raw fuel (stored in the fuel tank 7) to the evaporator 21 and other units 22-23 included in the fuel processing part. Linked with this, the blower 6 is also activated to start supplying air (oxidizer gas) to the fuel cell stack 1 by way of the oxidizer gas heating part 3. Off-gas (anode off-gas, cathode off-gas) produced during the electric power generation reaction is discharged from the fuel cell stack 1 and led into the heater 41 by way of two passages (anode off-gas passage 11exh and cathode off-gas passage 12exh), and after flowing through the heater 41 further fed into the combustor 4. Residual fuel remaining in the anode off-gas is combusted on the catalyst inside the heater 41 and combustor 4 producing the combustion gas, which is fed to the oxidizer gas heating part 3 and evaporator 21 by way of the combustion gas passage 13. The heat accompanying the combustion is transmitted to the fuel heat exchanger 22 and reformer 23. In this way, the temperatures of the processing parts 21-23 and oxidizer gas heating part 3 are raised and maintained in the level that enables them to perform their respective operations: the evaporator 21 evaporates raw fuel (ethanol solution), the reformer 23 reforms raw fuel (ethanol), and the oxidizer gas heating part 3 and fuel cell stack 1 perform their prescribed operations.

Basically, a supply flow rate of the raw fuel at the time of the start-up (i.e., an injection flow rate of the second fuel injector 52) is determined based on the stack outlet temperature $Tstk\_out$. More particularly, a target stack inlet temperature $Tint\_trg$ is set by adding a permissible temperature difference between the inlet and outlet of fuel cell stack ($\Delta Tstk$) to stack outlet temperature $Tstk\_out$ (i.e., $Tint\_trg=Tstk\_out+\Delta Tstk$). Then, the amount of heat that should be provided to the oxidizer gas heating part 3 to raise the temperature of oxidizer gas (i.e., The air taken into from the surrounding atmosphere at normal temperature, say, 25° C.) to the target stack inlet temperature $Tint\_trg$ is evaluated, and then the flow rate of the raw fuel that can produce the amount of heat is calculated. This flow rate is set to be the value at the start-up.

During the normal phase, on the other hand, the flow rate of the raw fuel (i.e., an injection flow rate of the first fuel injector 51) is determined based on a requested output of the fuel cell stack 1, in other word, a requested load on the fuel cell stack 1. In case the combustor 4 cannot produce enough heat to maintain the fuel cell stack 1 at its operating temperature solely by combusting the residual fuel in anode off-gas, the second fuel injector 52 is also activated in addition to first fuel injector 51 to compensate the shortage of fuel flow to the combustor 4 (FIG. 4).

(Description Based on a Flow Chart)

Figure 5:
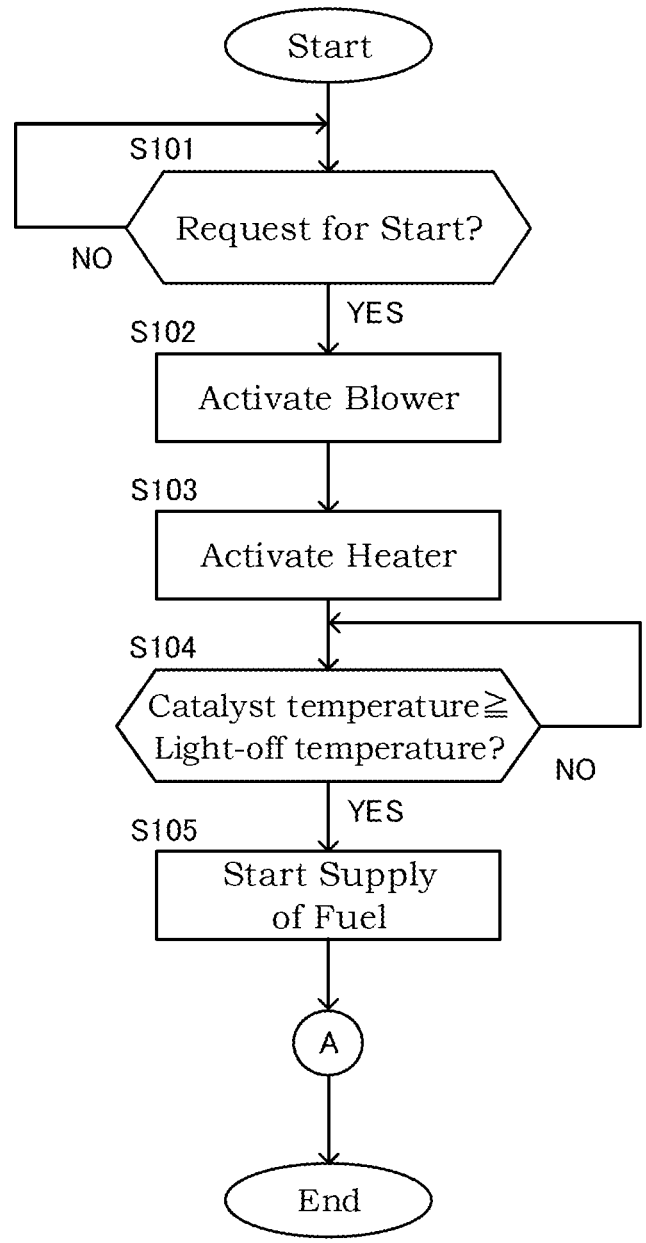
FIG. 5 represents a flow chart that indicates an overall flow of a control at the start-up phase of the above described fuel cell system.
Figure 6:
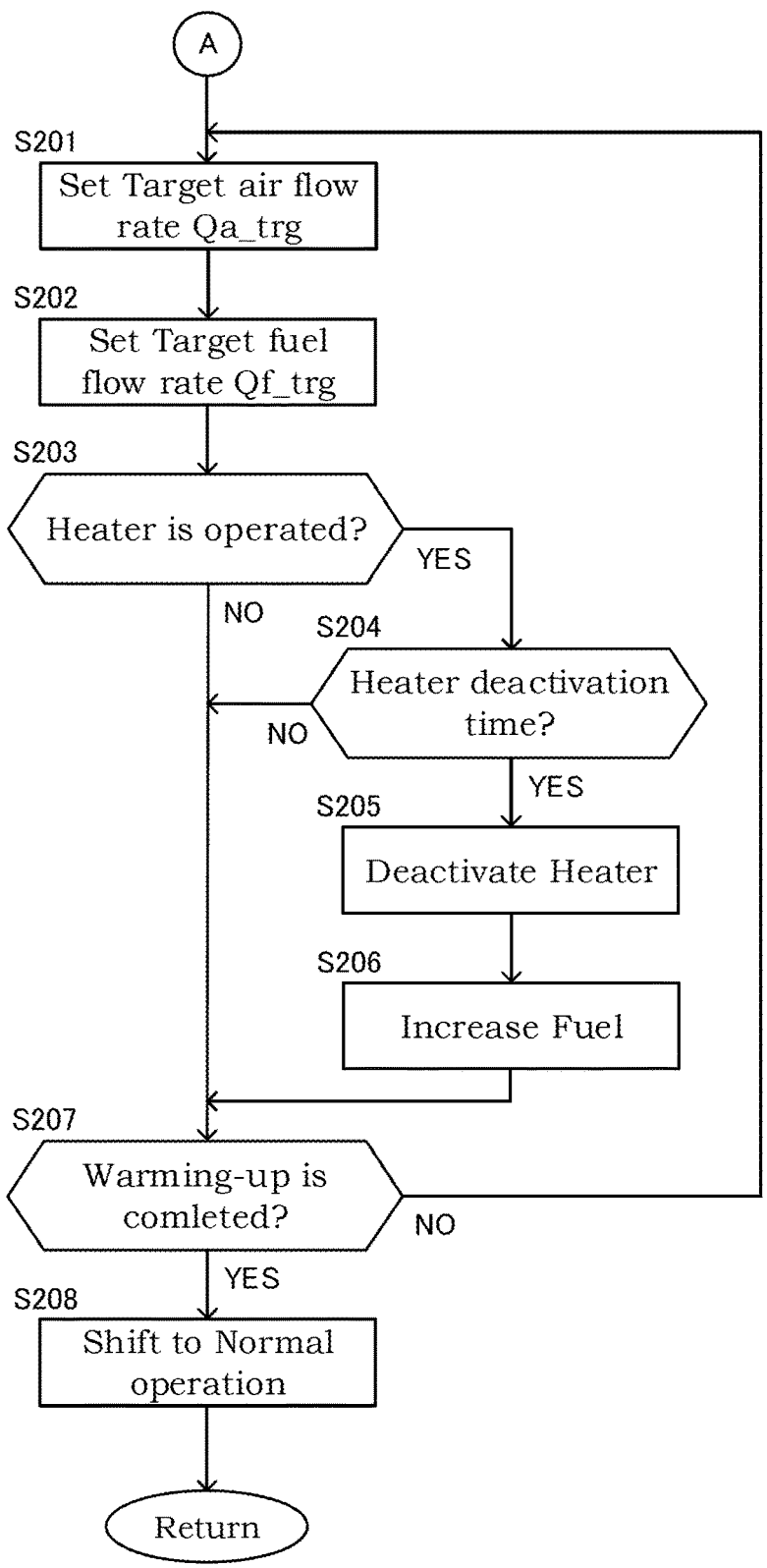
FIG. 6 represents a flow chart describing control operations taking place in "A" part during the start-up phase of the fuel cell system.
Figure 8:
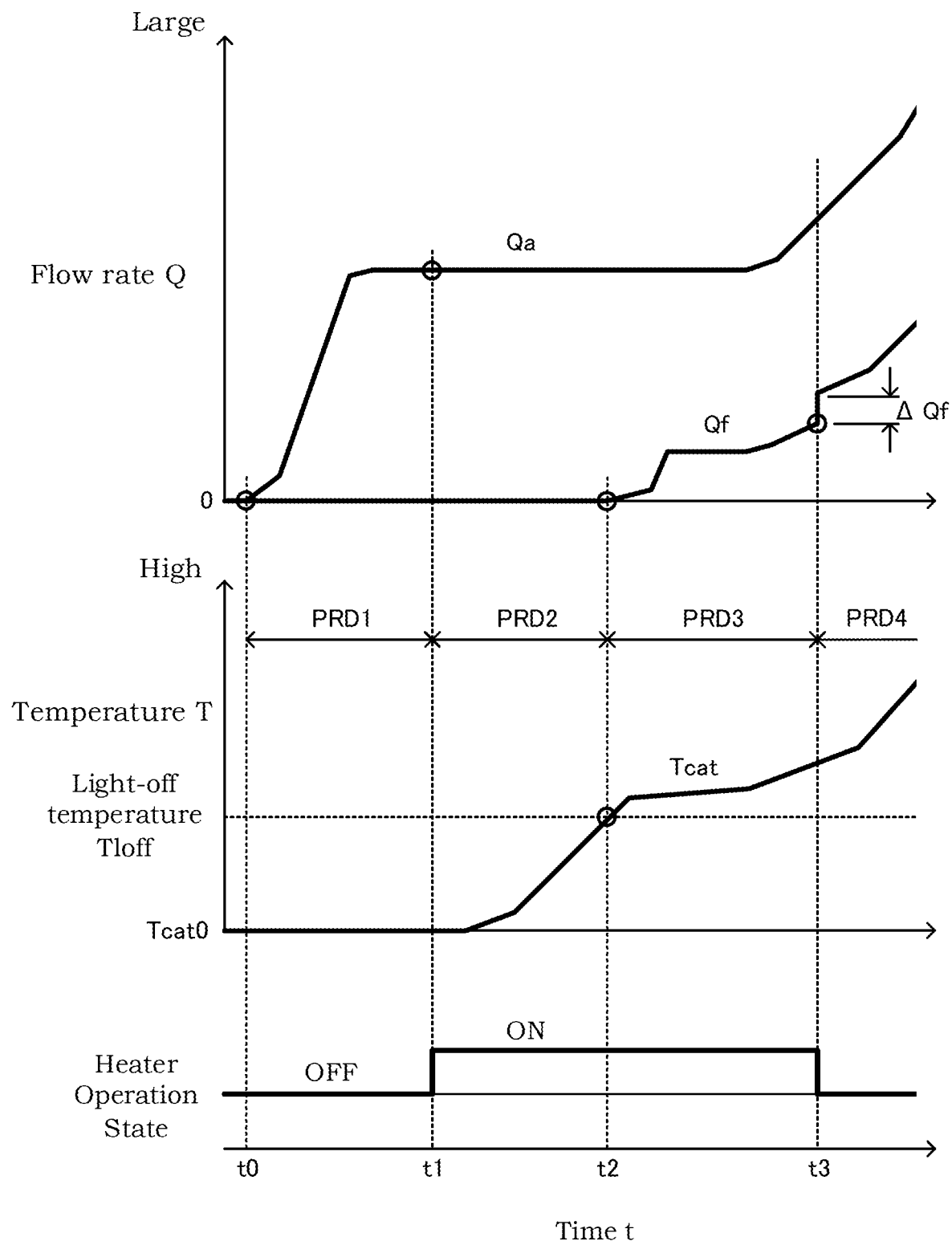
FIG. 8 is also an explanatory schematic drawing to illustrate the activation control scheme in reference to changes of flow rate and temperature.

FIG. 5 shows the overall flow of controls performed during the start-up of the system, where the warming-up of the fuel cell stack 1 is required. FIG. 6 further shows the steps that are executed in the section "A" of FIG. 5. The system controller 101 is programmed to start the control shown in FIG. 5 and FIG. 6 in response to a start-up request signal from the system start switch 201. The following paragraphs explain the details of the control operations executed during the start-up of system S referring to the time chart shown in FIG. 8.

In S101, the system controller 101 determines if it received the system start request to activate the fuel cell system S. If the system controller 101 received the system start request, the flow steps forward to S102 and subsequent steps.

In S102, the system controller 101 activates the blower 6, starting to provide oxidizer gas (i.e., air) to the combustor 4 (time: t0). In this embodiment, only the air is supplied to the combustor 4 during an initial phase after the start of the fuel cell system S.

In S103, the heater 41 is activated, and the electric heater included in the heater 41 starts to provide heat to the catalyst inside the combustor 4 (time: t1). In this embodiment, the system controller 101 places a waiting time subsequent to the activation of the blower 6 and starts the heater 41 only after the supply of air into the combustor 4 has become stable. Stabilization of air supply to the combustor 4 is determined by, for example, estimating fluctuation of air flow at the combustor 4 from variations of the air flow rate $Qa$ obtained by the oxidizer gas flow sensor 205, wherein the time required for the air flow to travel from the sensor to the combustor 4 is taken into consideration. For example, by evaluating in advance a delay time required for the air flow to the combustor 4 to stabilize after activation of the blower 6, elapse of this delay time can provide a good indication that the air supply has attained a stable state. In this embodiment, heat output from the heater 41 (i.e., electric heater output) per unit time remains constant.

In S104, a catalyst temperature $Tcat$ (hereinafter "catalyst temperature" simply indicates that of the combustor 4) inside the combustor 4 is evaluated if it has reached the light-off temperature $Tloff$ of the catalyst. If the catalyst temperature has reached the light-off temperature $Tloff$, the program proceeds to S105 (time: t2). Otherwise, the system controller 101 repeats S104 until the catalyst temperature attains the light-off temperature $Tloff$. One method to determine if the catalyst temperature has reached the light-off temperature is to place a temperature sensor in the catalyst bed to detect actual catalyst temperature. Alternatively, an estimation method can be used, wherein required parameters-air flow rate to the combustor 4, output of the heater 41 (heat generated of the electric heater), and a rate $\Delta T$ of change in the catalyst temperature $Tcat$ corresponding to the air flow rate and the output are evaluated for levels of air temperatures in advance, and the catalyst temperature $Tcat$ can be estimated from an initial temperature $Tcat0$ and the rate of change $\Delta T$ ($Tcat=Tcat0+\Sigma \Delta T$), the initial temperature $Tcat0$ being the catalyst temperature $Tcat$ at a start of operation of the heater 41. As a more simplified method, elapse of a prescribed time-length from the activation of the heater 41 may be used as an indication that the catalyst has reached the light-off temperature $Tloff$.

In S105, the system controller 101 activates the second fuel injector 52, starting to supply fuel to the combustor 4 (time: t2). This brings about fuel combustion on the catalyst (installed both in the combustor 4 and the heater 41), further increasing the catalyst temperature $Tcal$.

In S201 (refer to the flow chart in FIG. 6), a target air flow rate $Qa\_trg$ to be supplied to the combustor 4 is set (hereinafter simply "target air flow rate"). The level of the target air flow rate $Qa\_trg$ should be set carefully so that increased supply of air to the combustor 4 does not evade the catalyst out of its optimal active state. In this embodiment, the target air flow rate $Qa\_trg$ is increased in response to the increase in the catalyst temperature $Tcat$, specifically by a change rate $\Delta Qa$ predetermined for each catalyst temperature $Tcat$ ($Qa\_trg=Qa\_trg+\Delta Q$). The system controller 101 controls rotation velocity of the blower 6 based on the target air flow rate $Qa\_trg$.

In S202, a target fuel flow rate $Qf\_trg$ (hereinafter "target fuel flow rate") to the combustor 4 is set. As mentioned above, the target fuel flow rate $Qf\_trg$ is determined based on the level of stack outlet temperature $Tstk\_out$. More specifically, the target fuel flow rate $Qf\_trg$ is determined by first calculating the target stack inlet temperature Tint_trg by adding allowable temperature difference between the inlet and outlet of the fuel cell stack 1 (ΔTstk) to the stack outlet temperature Tstk_out, then a target combustion gas temperature Tcmb_trg is determined as the temperature required to raise the temperature of the ambient air intake (normal temperature) to the level of the target stack inlet temperature Tint_trg. Then, the flow rate of the fuel that should be fed into the combustor 4 to attain the target temperature Tcmb_trg of the combustion gas is calculated and this calculated value is set to the target flow rate Qf_trg. The calculation is based on an energy balance between the inlet and outlet of the combustor 4, which in turn is determined from the factors including: the flow rate and temperature of the air supplied to the combustor 4, the temperature of the fuel flow supplied to the combustor 4, and the thermal output from the heater 41. The system controller 101 controls the injection flow rate of the second fuel injector 52 on the basis of the target fuel flow rate Qf_trg.

In S203, the system controller 101 determines if the heater 41 is in operation. If the heater 41 is operating (i.e., the electric heater is energized), the program steps forward to S204. If not, the program steps forward to S207.

In S204, the system controller 101 determines if the time has arrived at the time point to terminate heat supply from the heater 41 to the combustor 4 (hereinafter referred to "heater deactivation time"). Further details of this determination method is described in later paragraphs. If the system has arrived at the heater deactivation time, the program steps forward to S205 (time: t3), and if not to S207 where the electric heater continues to be energized.

In S205, the electric heater is turned off and the heater 41 is deactivated (time: t3).

In S206, the target fuel flow rate Qf_trg is increased by a prescribed amount flow rate ΔQf (equivalent to "increase rate of flow"), thus the flow rate of fuel supply to the combustor 4 is increased (time: t3). In this embodiment, the prescribed flow rate ΔQf is set as an amount corresponding to the output of the heater 41 (i.e., heat generated by the electric heater) at a time prior to the heater is deactivated. As such, this parameter exemplifies the heat value corresponding to the thermal output of the electric heater at a time prior to the heater deactivation time. In other words, the flow rate of fuel is increased to compensate for the decline in the output from the heater 41, for the final purpose of maintaining the output of combustor 4. The output of the heater 41 can be evaluated easily from the voltage Vh applied to the electric heater and the current Ih that runs through the electric heater. In this embodiment where the output of the electric heater is constant, the prescribed flow rate ΔQf may also be constant.

In S207, the system controller 101 determines if the warming-up of the fuel cell system S has completed. Completion of warming-up can be determined, for example, by monitoring the stack outlet temperature Tstk_out and evaluating if the stack outlet temperature has reached a prescribed temperature which serves as an indication of a completion of the warming-up. If the stack outlet temperature Tstk_out is equal to or greater than the prescribed temperature that indicates the completion of the warming-up, the system controller 101 determines that the warming-up has completed and proceeds to S208. If the stack outlet temperature Tstk_out has not reached the prescribed temperature, the system controller 101 returns to S201, where fuel and air are supplied to the combustor 4 for continuing the operation of the combustor 4.

In S208, the system terminates warming-up and moves into the normal operations.

In this embodiment, the "combustion system" is composed of the combustor 4, heater 41, second fuel injector 52, fuel branch passage 11sub, blower 6, cathode gas supply passage 12, cathode off-gas passage 12ex and system controller 101, the "combustor" is composed of the combustor 4, the "first heater" is composed of the heater 41, the "fuel supply part" is composed of the second fuel injector 52 and fuel branch passage 11sub, the "oxidizer gas supply part" is composed of the blower 6, cathode gas supply passage 12 and cathode off-gas passage 12exh, and the "controller" is composed of the system controller 101 respectively. The functions of the "controller" in this embodiment are realized by the steps of S103, 210, 202, and 204-206 (see FIG. 5, FIG. 6).

Criteria for determining if the system has arrived at the heater deactivation time (see S204 in FIG. 6) are further described in the following paragraph.

In this embodiment, the decision whether or not the heater deactivation time has arrived is made based on the comparison of two heat values: the heat value Hf1 obtainable from the flow rate of the fuel setting in use prior to the deactivation of the heater, i.e. Qf1 or Qf_trg, and the heat value Hf2 required to raise the temperature of the fuel to the light-off temperature of the catalyst, the flow rate of the fuel being the fuel supply flow rate Qf2 after increased or the target fuel flow rate Qf_trg after increased (=Qf_trg+ΔQf). In other words, the determination is made based on the criteria if the heat value obtainable from the combustion of the fuel at the flow rate in use prior to the deactivation can provide enough heat to raise the fuel having the flow rate after increased up to the light-off temperature of the catalyst.

Figure 7:
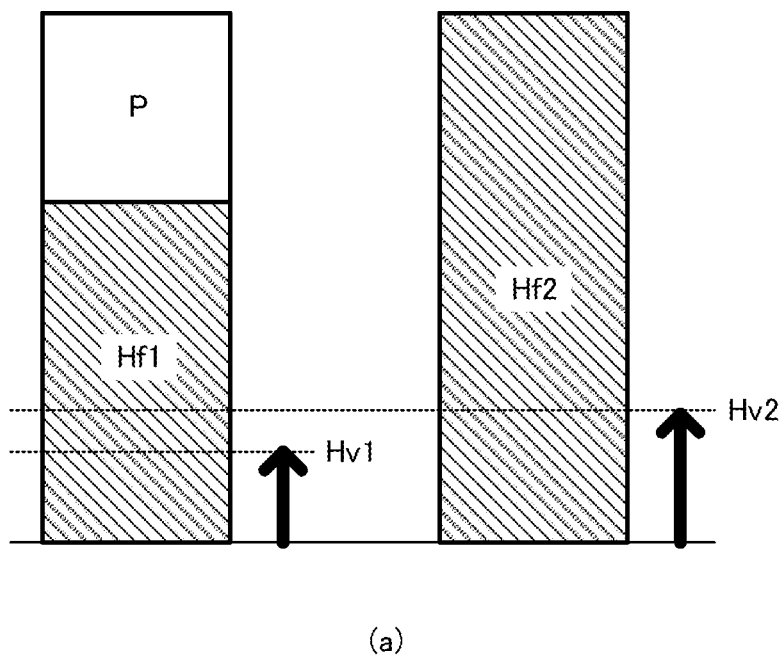
FIG. 7 is an explanatory schematic drawing to illustrate how the activation control scheme determines a timing to deactivate a first heater (an electric heater) in the activation control scheme.
Figure 7:
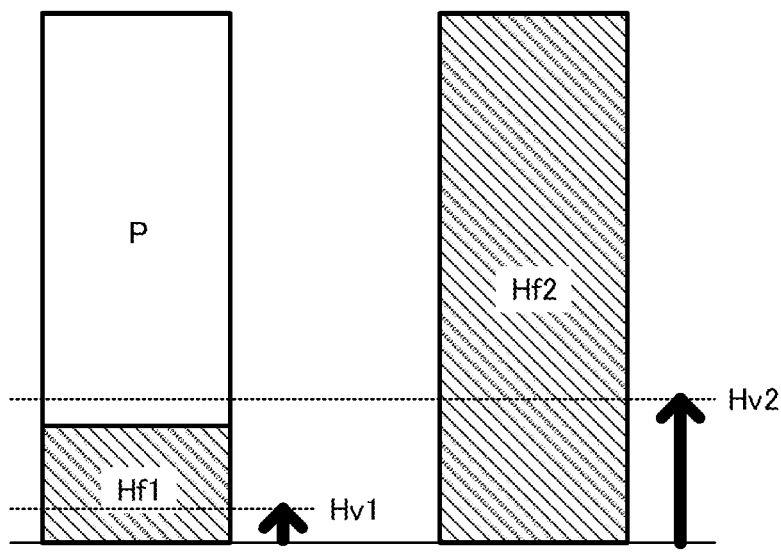

FIG. 7 is a schematic representation of the method used in this embodiment to determine if the system has arrived at the heater deactivation time. FIG. 7(a) shows the situation where the temperature of the fuel, which has been increased accompanying the heater deactivation, can be raised up to the light-off temperature Tloff (Hv2≤Hf1), and FIG. 7(b) shows the situation where the desired temperature rise cannot be achieved (Hf1<Hv2).

In reference to FIG. 7, the relations among the parameters during the period when the heater is deactivated can be represented using the following formulas.

$$Hv2 \le Hf1 = Qf1 \times LHV \quad (3.1)$$

$$Qf2 \times LHV = Qf1 \times LHV + P \quad (3.2)$$

The definition of each parameter is as follows: Qf1 is the fuel supply flow rate prior to the heater deactivation time; Qf2 is the fuel supply flow rate after it is increased, Hv1 is the amount of heat required to raise the temperature of fuel of volume Qf1 up to the light-off temperature Tloff, Hv2 is the amount of heat required to raise the temperature of fuel of the flow rate Qf2 after increased up to the light-off temperature Tloff, P is the generated heat of the electric heater, and LHV is a lower heating value of the fuel.

To make the descriptions more specific, it is provided that the fuel of the flow rate Qf1, which is equivalent to 1.0 kW, is supplied to the combustor 4 prior to the heater deactivation time, and the output of the electric heater is 0.5 kW. Then, it is also provided that the electric heater to be turned off (i.e., the heater 41 is deactivated). In this situation, it is also provided that the target fuel flow rate Qf_trg is increased so that the fuel having the flow rate Qf2, which is equivalent to 1.5 kW, is supplied. In this situation, given that a latent heat of evaporation Hv1 of fuel is 0.2 kW at the fuel flow rate Qf1 (before the electric heater is turned off), a latent heat of evaporation Hv2 at the fuel flow rate Qf2 after increased would be derived from the ratio of heat values before and after the flow rate increment (Hf2/Hf1), thus would become 0.3 kW. In this embodiment, a comparison is made between two heat values: the heat value obtainable from combustion of the fuel having flow rate Qf1 (before the electric heater is turned off) which is Hf1 (1.0 kW), and the latent heat of evaporation Hv2 at the flow rate Qf2 after increased, which is 0.3 kW. If the heat value Hf1 (1.0 kW in this case) is greater than Hv2 (0.3 kW in this case), the system controller 101 determines that the temperature of the increased fuel can be raised up to the light-off temperature Tloff, although the heater has been turned off.

In this embodiment, as described above, the following two parameters are selected for comparison: the heat value Hf1 obtainable from of fuel flow rate Qf1 (before the heater is deactivated) and the latent heat of evaporation Hv2 of the fuel having the flow rate Qf2 after increased. Then, if the heat value obtainable from the combustion of the fuel having the flow rate Qf1 is large enough to compensate the heat loss caused by the latent heat of evaporation of the fuel after increased, the system controller 101 determines that it is possible to raise the fuel temperature up to the light-off temperature Tloff. The determination scheme is not limited to the above: for example, the heat required to raise the temperature of the fuel after increased from normal temperature up to the light-off temperature Tloff can be calculated. The calculation may be realized by taking into consideration specific heat of the fuel, both in liquid and gaseous phase in addition to the latent heat of evaporation.

(Description of Effects)

The fuel cell system S relating to this embodiment is constituted as described above. In the following paragraphs, effects obtainable by implementing this embodiment are described.

(i) Implementation of the heater 41 to provide heat to the catalyst inside the combustor 4 has an effect of promoting catalyst activity and bringing about a favorable fuel combusting reaction on the catalyst at an earlier stage. Regarding the rise of catalyst temperature, the heater 41 is deactivated at an prescribed timing accompanied by an increase of the flow rate Qf of the fuel provided to the combustor 4, wherein the timing to deactivate the heater 41 (heater deactivation time) is set to the time when the heat value Hf1 obtainable from the combustion of fuel evaluated at a time prior to the heater deactivation becomes equal to, or greater than the heat value Hv2 required to raise the temperature of the fuel of the flow rate Qf2 after increased up to the catalyst's light-off temperature Tloff. In this way, much of the heat generated by the combustion is used to evaporate the fuel after increased, enabling the system to prevent excessive lowering of the catalyst temperature, i.e., temperatures lower than the light-off temperature Tloff, thus further enabling to maintain favorable catalyst activity after the heater 41 has been deactivated.

(ii) Linked with the turning off the heater, the fuel supply flow rate Qf is increased by the flow rate ΔQ which corresponds to the output of the heater 41. This scheme enables the combustor 4 to maintain its output level, as well as to promote the warming-up of the fuel cell stack 1.

(iii) The heater is equipped with an electric heater and provides heat generated by the electric heater to the catalyst inside the combustor 4. This scheme enables easy turning on/off of the heater 41 and is advantageous to reduce the number of components required to constitute the fuel cell system S.

(iv) The catalyst in the heater 41 is supported in a way that it is arranged on the surface of flow passage advantageous to receive heat from the electric heater, enabling speed up of the warming-up of the fuel cell stack 1 through efficient utilization of catalyst reaction with the fuel.

(v) The output of the heater 41 can be evaluated easily from the voltage Vh of the electric heater and the current Ih that runs through the electric heater.

(Description of Other Embodiments)

In the aforementioned embodiment, the determination if the system has arrived at the heater deactivation time is made based on the comparison between the two heat values: the heat value Hf1 obtainable from the flow rate Qf1 prior to the heater deactivation time, and the heat value Hv2 required to raise the temperature of the fuel having the flow rate after increased due to the heater deactivation up to the light-off temperature Tloff. The determination criteria is not limited to this: for example, the amount of heat dissipation Hloss from the combustor 4 during a period prior to the heater deactivation may be used as a reference value.

More particularly, a determination can be made by evaluating the difference between the heat value Hf1 obtainable from the combustion of the fuel having the flow rate Qf1 and the heat dissipation (Hloss) from the combustor 4 during the period prior to the heater deactivation, and by comparing the difference of the heat values (i.e., Hf1−Hloss) with that required to raise the temperature of the fuel having the flow rate after increased up to the light-off temperature Tloff. This scheme allows evaluation of substantial heat value that contributes to maintain catalyst activity after heater has been deactivated, enabling more accurate determination of the time the heater should be deactivated. This judgment scheme can be expressed using the following formulas. The heat dissipation Hloss from the combustor 4 can be evaluated from the temperature (Tcmb) of combustion gas or the combustor 4. The combustion gas temperature Tcmb can be obtained as an adiabatic flame temperature from the fuel supply flow rate Qf and oxidizer gas Qa.

$$Hv2 \leq Hf1 - Hloss = (Qf1 \times LHV) - Hloss \quad (4.1)$$

$$Qf2 \times LHV = QF1 \times LHV + P \quad (4.2)$$

$$Hloss = A \times h \times (Tcmb - Ta) \quad (4.3)$$

In these formulas, A represents the surface of the combustor 4, h represents a thermal resistance or thermal exchange coefficient of the combustor 4, and Ta represents the ambient temperature respectively.

Further advantage of this scheme is the ability, in the process of evaluating heat value Hv2 required to raise the fuel after increased to the light-off temperature Tloff, to include the heat required for raising the temperature of oxidizer gas, in addition to the fuel, up to the light-off temperature Tloff.

More specifically, the sum of two heat values is calculated: the one required to raise the fuel temperature to the light-off temperature Tloff, and the other required to raise the oxidizer gas temperature to the light-off temperature Tloff. Then, the sum is compared with the heat value Hf1 obtainable from the combustion of the fuel having the flow rate Qf1 prior to the heater deactivation time. In this way, the knowledge of the heat value for raising the fuel temperature allows the heater deactivation time to be more accurately determined. The formulas for implementing this scheme are as follows:

$$Hv2 + Qa \times Cp(Tloff - Tstk\_out) \leq Hf1 = Qf1 \times LHV \quad (5.1)$$

$$Qf2 \times LHV = Qf1 \times LHV + P \quad (5.2)$$

Where, Cp represents the specific heat of the oxidizer gas (i.e., ambient air).

The above descriptions given to the embodiments assume indirect heating of the catalyst inside the combustor 4, wherein the heater 41 heats fuel or air first and the heat accumulated in these media is transmitted to the catalyst. However, the heater 41 may also heat the combustor 4 directly, providing heat to the catalyst in a more direct fashion.

Furthermore, the above descriptions given to the embodiments assume that warming-up of the fuel cell stack 1 to take place at the starting-up of the system. However, the method used to determine the timing to deactivate the heater, relating to these embodiments, may be applied to the system in the normal operation. In other words, when the catalyst temperature in the combustor 4 falls to the level that hinders effective combustion of the fuel, the heater 41 is activated to restore active state rapidly, and the heater 41 is deactivated when the system comes into the state where stoppage of heat supply from the heater 41 does not hinder optimum activity of the catalyst (i.e., the system has arrived at the heater deactivation time).

Furthermore, the heater 41 may have a variable thermal output, as well as a fixed output. Even with a variable thermal output heater, the conditions relating to the determination of heater deactivation time may be satisfied by, for example, reducing gradually the thermal output from the heater 41 in response to the rise in catalyst temperature Tcat. This control scheme applies even if the increase of the fuel flow, as has been described hitherto, does not occur.

Furthermore, the heater 41 may have a diffusion combustion device in place of, or with the electric heater. The heat produced by the diffusion combustion device is also provided to the catalyst inside the combustor 4 to raise its temperature. This provides wider options in configuring the heater 41.

Another possible variation is to implementation a second heater, in addition to the combustor 41 (the first combustor), to which the combustion gas produced in the combustor 4 is provided. The idea is to provide the heat contained in the combustion gas to the catalyst inside the combustor 4 by way of the second heater. This approach enables quicker rise of catalyst temperature.

Descriptions up to here relate only to applications of the combustion system to the power generation system having a fuel cell stack 1, i.e, to the fuel cell system S. But the combustion system's scope of application is not limited to this. The system described herein may be provided only for the purpose of producing combustion gas.

The embodiments of the present invention have been described above, but the embodiments just show some applications of the present invention and are not intended to limit the technical scope of the present invention to the concrete configurations of the embodiments. To those who skilled in the art, it will be apparent to make variety of alterations and modifications within the scope of the invention according to the claims.

The invention claimed is:

1. A control method of a combustion system for controlling combustion of fuel within a combustor, the combustion system including the combustor having a catalyst for promoting the combustion and a first heater arranged so as to be able to supply heat to the catalyst, comprising:
   supplying the fuel and oxidizing gas to the combustor along with providing the heat to the catalyst by the first heater; and
   deactivating the first heater at a prescribed timing and increasing a flow rate of the fuel greater than that have been set before deactivating the first heater, wherein
   the prescribed timing is determined as a timing at which a generated heat of the fuel prior to deactivation of the first heater becomes equal to or greater than a heat required for raising a temperature of the fuel having the flow rate after increased up to a light-off temperature of the catalyst.

2. The control method of the combustion system according to claim 1, wherein
   the flow rate of the fuel is increased at the prescribed timing by an amount according to an output of the first heater prior to the deactivation.

3. The control method of the combustion system according to claim 1, comprising;
   determining whether or not the prescribed timing has arrived, based on the flow rate of the fuel and an output of the first heater prior to the deactivation of the first heater and,
   increasing the flow rate of the fuel to be supplied to the combustor along with deactivating the first heater when determining that the prescribed timing is arrived.

4. The control method of the combustion system according to claim 3, wherein
   in determining whether or not the prescribed timing has arrived, the generated heat of the fuel prior to the deactivation of the first heater is calculated by subtracting a heat dissipation of the combustor from the heat value obtainable from the flow rate of the fuel prior to the deactivation of the first heater.

5. The control method of the combustion system according to claim 4, wherein
   the heat dissipation of the combustor is calculated based on a combustion gas temperature of the fuel, and
   the combustion gas temperature is calculated as an adiabatic flame temperature based on the flow rate of the fuel and oxidizer gas.

6. The control method of the combustion system according to claim 1, wherein
   the heat required to raise the temperature of the fuel having the flow rate after increased up to the light-off temperature of the catalyst is calculated as a sum of the following two heat values: one is the heat required to raise a fuel temperature to the light-off temperature of the catalyst, and the other is the heat required to raise the temperature of oxidizer gas to the light-off temperature.

7. The control method of the combustion system according to claim 1, wherein
   the first heater is disposed on an upstream side to the combustor in a fuel flow direction for the fuel being feed into the combustor.

8. The control method of the combustion system according to claim 7, wherein
   the first heater has an electric heater, a heat generated from the electric heater being feed to the catalyst.

9. The control method of the combustion system according to claim 8, wherein
   the first heater has a passage wall surface configured to receive the heat from the electric heater, and the catalyst for promoting the combustion is arranged on a surface of the passage wall.

10. The control method of the combustion system according to claim 8, wherein
an output of the first heater is calculated based on at least one of a voltage applied to the electric heater and a current running through the electric heater when the flow rate of the fuel is increased at the prescribed timing by an amount corresponding to the output of the first heater prior to the deactivation.

11. The control method of the combustion system according to claim 7, wherein
the first heater has a diffusion combustion device, and a heat generated by the diffusion combustion device is provided to the catalyst.

12. The control method of the combustion system according to claim 1, wherein
the combustion system further comprises a second heater arranged so as to be able to receive combustion gas supply from the combustor and provide the heat contained in the combustion gas to the catalyst of the combustor.

13. The control method of the combustion system according to claim 1, wherein
the combustion system constitutes a part of a power generation system having a fuel cell, and the combustor is configured to utilize combustion gas for heating or warming the fuel cell.

14. A control method of a combustion system for controlling combustion of fuel within a combustor, the combustion system including the combustor having a catalyst for promoting the combustion and a first heater arranged so as to be able to supply heat to the catalyst, comprising:
supplying the fuel and oxidizing gas to the combustor;
increasing a flow rate of the fuel after a supply of the fuel being started along with providing heat to the catalyst by the first heater; and
increasing the flow rate of the fuel at a prescribed timing after starting the supply of the fuel along with deactivating the first heater, the flow rate being increased by an amount according to an output of the first heater prior to deactivation of the first heater, wherein
the prescribed timing is determined as a timing at which a generated heat of the fuel according to the flow rate prior to the deactivation of the first heater becomes greater than a latent heat of vaporization of the fuel having the flow rate after increased.

15. A control method of a combustion system for controlling combustion of fuel within a combustor, the combustion system including the combustor having a catalyst for promoting the combustion and a first heater arranged so as to be able to supply heat to the catalyst, comprising:
supplying the fuel and oxidizing gas to the combustor along with providing heat to the catalyst by the first heater; and
increasing a flow rate of the fuel at a prescribed timing after starting a supply of the fuel along with deactivating the first heater by an amount according to an output of the first heater prior to deactivation of the first heater, wherein
the flow rate of the fuel is increased so that a temperature of the catalyst remains equal to or greater than a light-off temperature of the catalyst.

16. A combustion system comprising:
a combustor having catalyst for promoting combustion,
a first heater connected to the combustor so as to supply heat to the catalyst,
a fuel supply part configured to supply the fuel to the combustor,
an oxidizer gas supply part configured to provide oxidizer gas to the combustor, and
a controller controlling operations of the first heater, fuel supply part and oxidizer gas supply part, wherein
the controller is configured to:
supply the fuel and oxidizer gas flow to the combustor in both of a Phase I and a Phase II when the combustor comes into operation, the Phase I being for providing heat from the first heater to the catalyst by activating the first heater, the Phase II being for deactivating the first heater;
in the Phase I, increase a ratio of a heat obtainable from the fuel to an output from the first heater in response to a temperature rise of the catalyst; and
in the Phase II, increase a flow rate of the fuel supplied to the combustor more than that of the Phase I, wherein
the controller is configured to:
during the Phase I, determine whether or not a prescribed timing has arrived, the prescribed timing being a timing when the heat value of the fuel becomes equal to or greater than the heat required to raise a temperature of the fuel having the flow rate after increased up to a light-off temperature of the catalyst; and
implement a transfer from the Phase I into the Phase II when determining the prescribed timing has arrived.

* * * * *